United States Patent
Ying Yin Ho

(10) Patent No.: US 7,066,034 B2
(45) Date of Patent: Jun. 27, 2006

(54) START-UP METHOD AND SYSTEM FOR PERMANENT MAGNET SYNCHRONOUS MOTOR DRIVE

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/828,873

(22) Filed: Apr. 20, 2004

(65) Prior Publication Data

US 2004/0249596 A1    Dec. 9, 2004

Related U.S. Application Data

(63) Continuation-in-part of application No. 10/294,201, filed on Nov. 12, 2002, now Pat. No. 6,910,389.

(60) Provisional application No. 60/465,890, filed on Apr. 25, 2003, provisional application No. 60/337,506, filed on Nov. 12, 2001.

(51) Int. Cl.
*G01L 3/02* (2006.01)

(52) U.S. Cl. ............................................... 73/862.193

(58) Field of Classification Search ........... 73/862.193; 324/772; 318/254, 701, 700, 138, 432, 721, 318/807, 439, 632

See application file for complete search history.

(56) References Cited

U.S. PATENT DOCUMENTS

| | | | |
|---|---|---|---|
| 4,777,422 A * | 10/1988 | Slicker et al. | 318/800 |
| 5,272,429 A | 12/1993 | Lipo et al. | |
| 5,339,012 A * | 8/1994 | Schroedl et al. | 318/254 |
| 5,467,025 A * | 11/1995 | Ray | 324/772 |
| 5,569,994 A | 10/1996 | Taylor et al. | |
| 5,608,300 A | 3/1997 | Kawabata et al. | |
| 6,005,364 A | 12/1999 | Acarnley | |
| 6,081,087 A | 6/2000 | Iijima et al. | |
| 6,081,091 A | 6/2000 | Mitchell et al. | |
| 6,249,067 B1 | 6/2001 | Schob et al. | |

(Continued)

OTHER PUBLICATIONS

Sensorless Control of AC Machines at Low Speed and Standstill Based on the "INFORM"Method—Manfred Schroedl, Member, IEEE 1996 pp. 270-277.

*Primary Examiner*—Max Noori
*Assistant Examiner*—Octavia Davis
(74) *Attorney, Agent, or Firm*—Ostrolenk, Faber, Gerb & Soffen, LLP

(57) ABSTRACT

A method of determining a rotor angle in a drive control for a motor, comprising the steps of (a) determining a rotor magnetic flux in the motor; (b) estimating the rotor angle on the basis of the rotor magnetic flux; and (c) correcting the estimated rotor angle on the basis of reactive power input to the motor. Step (a) may include the step of non-ideal integration of stator voltage and current values. Step (b) may include the step of correcting phase errors caused by said non-ideal integration via a PLL circuit with phase compensation (F). Step (c) may include the steps of (1) calculating a first reactive power input value as $1.5*We*(C\_Lq*I*I)$ and a second reactive power input value as $1.5*(Vq*id-Vd*iq)$; (2) determining a difference between said first and second reactive power input values; and (3) applying said difference to the rotor angle estimated in step (b) to obtain a corrected rotor angle. At higher motor frequencies, the estimated rotor angle is based on the rotor magnetic flux. At lower frequencies, it is based on a predetermined motor load model which is used in conjunction with a start-up sequencing logic circuit.

46 Claims, 8 Drawing Sheets

U.S. PATENT DOCUMENTS

| | | |
|---|---|---|
| 6,327,524 B1 * | 12/2001 | Chen .......................... 701/22 |
| 6,377,019 B1 * | 4/2002 | Chen .......................... 318/807 |
| 6,396,229 B1 | 5/2002 | Sakamoto et al. |
| 6,396,236 B1 * | 5/2002 | Luukko ...................... 318/700 |
| 6,441,572 B1 | 8/2002 | Batzel |
| 6,462,491 B1 | 10/2002 | Iijima et al. |
| 6,552,509 B1 | 4/2003 | Veltman |
| 6,653,829 B1 | 11/2003 | Henry et al. |
| 6,694,287 B1 | 2/2004 | Mir et al. |
| 6,856,109 B1 * | 2/2005 | Ho ............................ 318/254 |

* cited by examiner

START-UP METHOD AND SYSTEM FOR PERMANENT MAGNET SYNCHRONOUS MOTOR DRIVE

CROSS-REFERENCE TO RELATED APPLICATIONS

This application is based on and claims priority of U.S. Provisional Patent Application Ser. No. 60/465,890, filed Apr. 25, 2003, and Ser. No. 60/337,506 filed Nov. 12, 2001, the disclosures of which are incorporated by reference.

This application is a continuation-in-part of U.S. Ser. No. 10/294,201, filed Nov. 12, 2002, now U.S. Pat. No. 6,910,389 the disclosures of which, including a Preliminary Amendment filed Jan. 13, 2003, are incorporated by reference.

FIELD OF THE INVENTION

This invention relates to controls for motor drives and more specifically relates to a technique for the estimation of rotor angle in a permanent magnet synchronous motor (PMSM) drive, particularly when starting a PMSM from a standstill.

BACKGROUND OF THE INVENTION

Rotor position information is in general required for the stable operation of permanent magnet AC motors having sinusoidal current excitation. Continuous rotor position has been obtained in the past from encoders mounted on the motor shaft or indirectly through estimation algorithms based on voltage and current feedback. The latter is preferred because it results in lower system and operating cost.

However, most passive rotor estimation schemes (based on measured voltage and current) are complex and require precise knowledge of the motor parameters such as resistance and inductance. These parameters, particularly the stator resistance, change widely with temperature. This leads to inaccuracy in rotor angle estimation and results in control stability problems, reduced torque per ampere capability and degradation of motor operating efficiency.

Ser. No. 10/294,201 describes a method wherein the rotor angle is estimated via a phase-lock loop (PLL), which locks on the motor's magnetic flux, particularly during the normal running mode.

However, the inventor has observed that additional problems arise during start-up. At zero speed or low speed (<10%) conditions, it is difficult to accurately measure or estimate motor voltages due to the low amplitude of motor back EMF (BEMF). In most sensor-less (having no shaft encoder) control drives, the tracking of rotor angle based on BEMF normally fails at low speeds (<5%). Therefore, sensor-less control of a permanent magnet motor drive requires some means of starting the motor. In most cases, the motor is started in an open-loop (without use of any feedback) fashion. As soon as the motor speed picks up (typically>10%), the drive switches to closed-loop (using current and/or voltage feedback) control mode. However, during the switchover from open loop to closed-loop mode, torque and current pulsation may occur due to mode transitioning.

It would therefore be desirable to provide a rotor angle estimation scheme which provides maximum torque per ampere performance without requiring accurate knowledge of the stator resistance or other motor parameters.

It would further be desirable to provide a scheme for estimating rotor angle during start-up so as to provide for robust start-up and reduce the occurrence of torque pulsation during start-up of the motor.

BRIEF SUMMARY OF THE INVENTION

The invention provides a novel method of estimating rotor angle information for the control of a permanent magnet AC motor having sinusoidal back EMF.

The rotor angle is estimated via a phase-lock loop (with phase error compensation) which receives an estimate of the rotor magnetic flux. The rotor magnetic flux is obtained from the stator voltage (actual voltage or command voltage), current, resistance and inductance.

Then, the rotor angle estimation error (stator resistance change due to temperature) is removed by using a novel angle error corrector. This corrector is based on reactive power compensation and is insensitive to resistance change. Furthermore, only one inductance parameter is required for the angle corrector's reference model.

To provide robust start-up and reduce torque pulsation during starting of the motor, the invention makes use of the above-mentioned PLL in conjunction with a newly developed start-up logic. The start-up logic comprises a start-up sequencer and a mechanical model. These elements can be made very simple since they utilize the same PLL integrators that are used for estimation of rotor angle in Ser. No. 10/294,201.

The estimated flux information is used by the PLL in the closed-loop mode to track rotor angle. The simple mechanical model is used by the PLL in the open-loop made to predict rotor angle. The start-up sequencing logic is used to provide robust and smooth transition from the open-loop to the closed-loop control mode during motor start-up.

Thus, a rotor angle estimation algorithm for sensorless control of a PM motor may comprise one or more of the following exemplary features.

(1) a flux estimator with feed-forward inductance compensation. A vector PLL locks to the output of the flux estimator. A non-ideal flux estimator is used in conjunction with the flux PLL for rotor angle estimation.

(2) a phase compensation circuit (F) included in the PLL to eliminate the phase error introduced by the non-ideal flux estimator.

(3) a compensation scheme based on reactive power eliminates the sensitivity of the rotor angle estimation method to stator resistance variations.

(4) a start-up sequencer and a load model operate in conjunction with the vector PLL to achieve robust start-up and smooth speed ramp-up.

Other features and advantages of the present invention will become apparent from the following description of embodiments of the invention which refers to the accompanying drawings.

DETAILED DESCRIPTION OF THE DRAWINGS

The present invention is described herein as related to a motor control algorithm that is implemented in firmware. However, the scope of the invention includes implementations in any combination of hardware, firmware and software that would have been foreseeable within the ordinary level of skill in the art.

Figure 1:
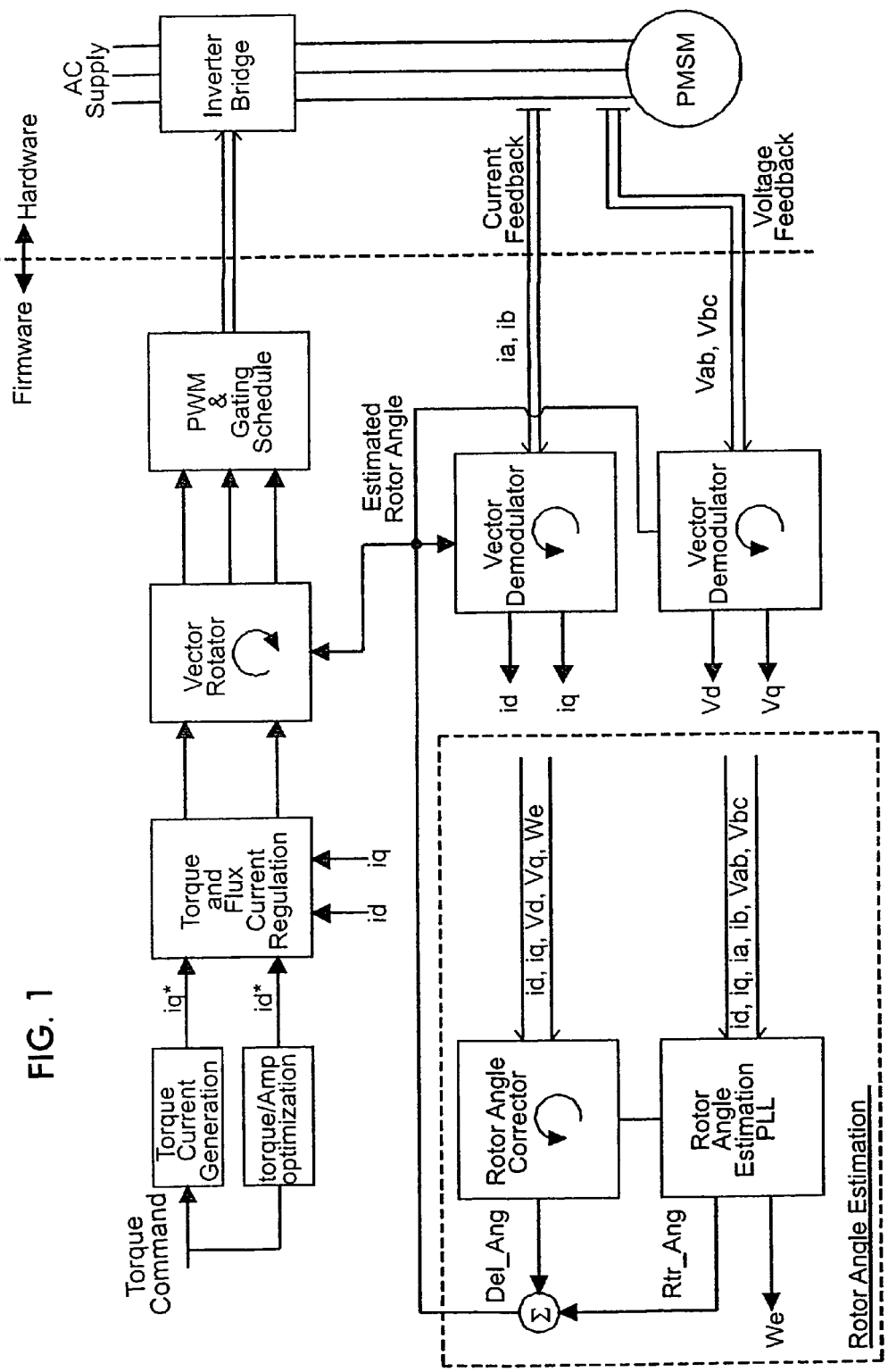
FIG. 1 is a block diagram showing a PMSM control system which includes a first embodiment of the invention.

A block diagram of a first embodiment of the control method is shown in FIG. 1. The d-axis is the orientation which aligns with the magnetic axis of the rotor (the convention used in the literature).

The following are the definitions of the quantities listed in FIG. 1.

| | |
|---|---|
| id* | flux current command |
| iq* | torque current command |
| id | flux current feedback |
| iq | torque current feedback |
| ia, ib | phase currents |
| Rtr_Ang | estimated rotor angle |
| C_Rs | stator per phase resistance |
| Del_Ang | compensation angle from angle corrector |
| Vab, Vbc | line voltage feedbacks |
| Vd | flux-axis voltage feedback |
| Vq | torque-axis voltage feedback |
| We | inverter fundamental frequency |

Figure 2:
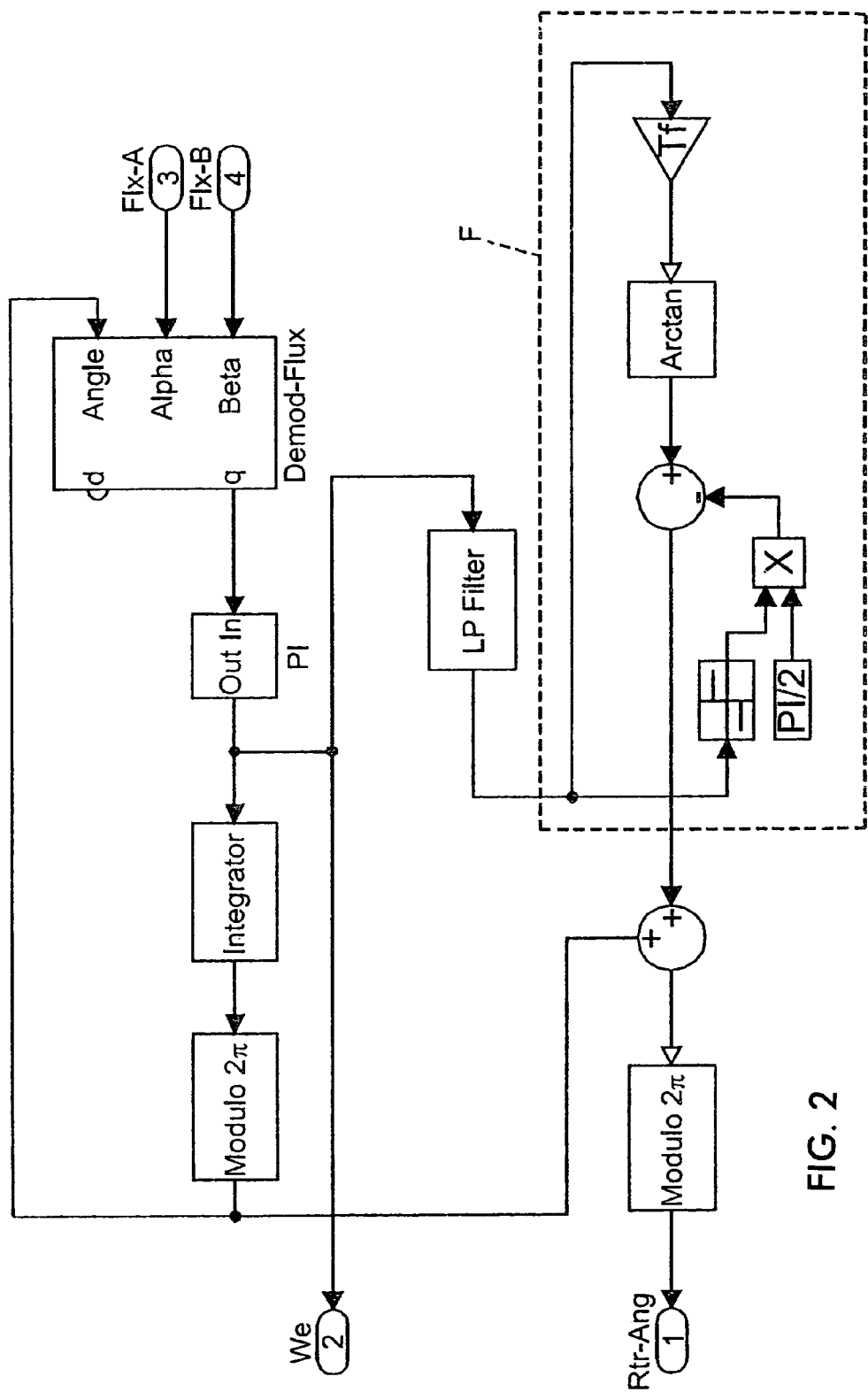
FIG. 2 is a more detailed block diagram showing the rotor angle estimator of FIG. 1.
Figure 3:
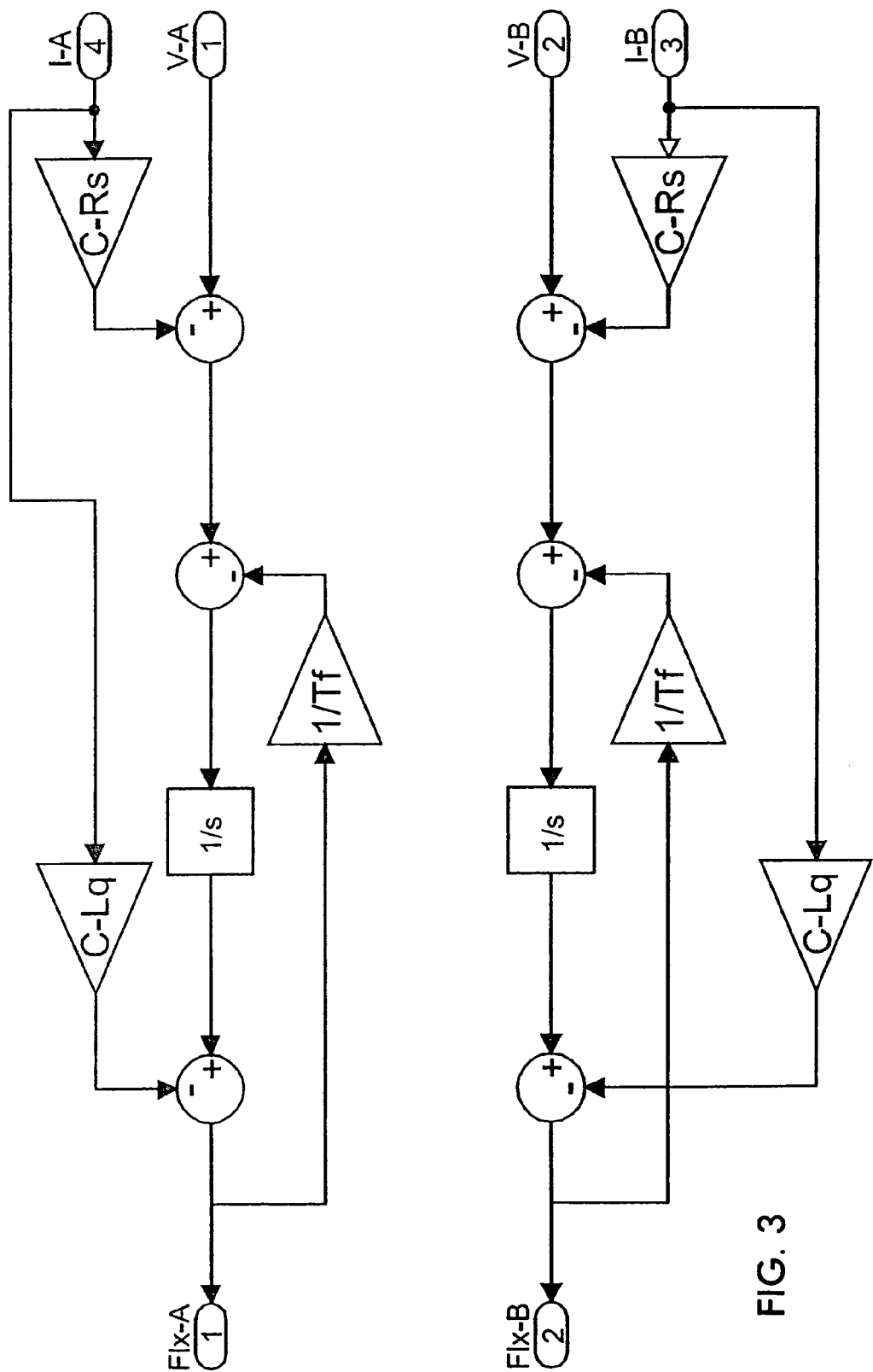
FIG. 3 is a circuit diagram of a rotor magnetic flux estimator associated with the diagram of FIG. 2.

The rotor angle estimation block of FIG. 1 is shown in detail in FIG. 2. The inputs Flx_A and Flx_B are rotor magnetic fluxes which are obtained by non-ideal integration of motor back emf which is formed by the stator current, voltage, resistance and inductance as shown in FIG. 3. In the Figures, Tf represents the time constant of the non-ideal integrator.

It will be noted that the inputs (V_A, V_B, I_A and I_B) to the flux estimator of FIG. 3 are simply the 3-phase (ia, ib, Vab, Vbc) to 2-phase transformed signals.

The rotor angle estimator (FIG. 2) utilizes a novel flux phase lock loop system. A frequency feedforward circuit F compensates for phase errors due to the non-ideal integration of stator voltages which was used in FIG. 3 to obtain the flux. The phase error generated by the non-ideal integration is fully compensated for in the circuit F.

Then, the estimation error due to resistance is compensated by a rotor angle corrector system which is described below in connection with FIG. 4.

Figure 4:
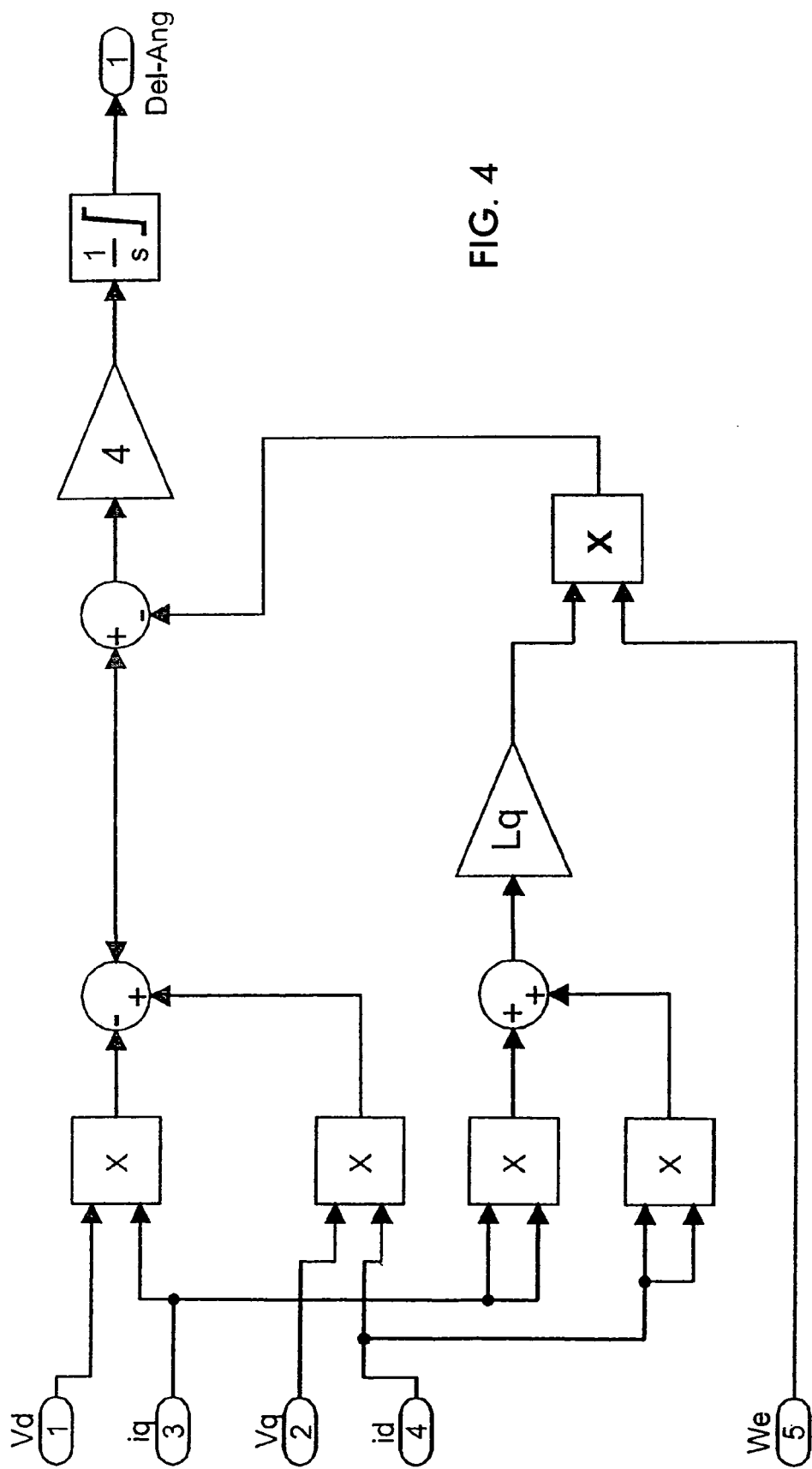
FIG. 4 is a more detailed diagram showing the rotor angle corrector of FIG. 1.

The rotor angle corrector circuit of FIG. 1 is shown in detail in FIG. 4. When the estimated rotor angle (FIG. 1) matches up with the actual rotor angle, a reference value for the reactive power (Q) input to the motor is equal to:

$$1.5*We*(C\_Lq*I*I+Flx\_M*id+(C\_Ld-C\_Lq)*id*id)$$

Note, however, that for a permanent magnet surface mount (PMSM) motor, the airgap reluctance is identical in the d-axis and the q-axis. Thus, id=0 and Ld=Lq. Therefore, the above equation for reference reactive power can be reduced to:

$$1.5*We*(C\_Lq*I*I)$$

The actual motor reactive power (Q), expressed in terms of voltage and current only, is then computed by:

$$Q=1.5*(Vq*id-Vd*iq).$$

In the foregoing equations:
C_Ld—d-axis inductance,
C_Lq—q-axis inductance,
I—Stator current magnitude,
Flx_M—Equivalent flux linkage of rotor magnet,
Q—Terminal reactive power, and
We (omega e)—stator fundamental frequency.

Since C_Ld=C_Lq, the rotor angle correction can be achieved with only one inductance parameter (Lq or Ld). Lq is used in this case. Of course, the invention is adapted for use with other motor types as well, such as interior permanent magnet motors in which Ld is not equal to Lq, as will be appreciated by those having the ordinary level of skill in the art.

If the estimated rotor angle matches up with the actual rotor angle then the following relationship will be satisfied:

$$(Vq*id-Vd*iq)-We*C\_Lq*I*I=0$$

Figure 5:
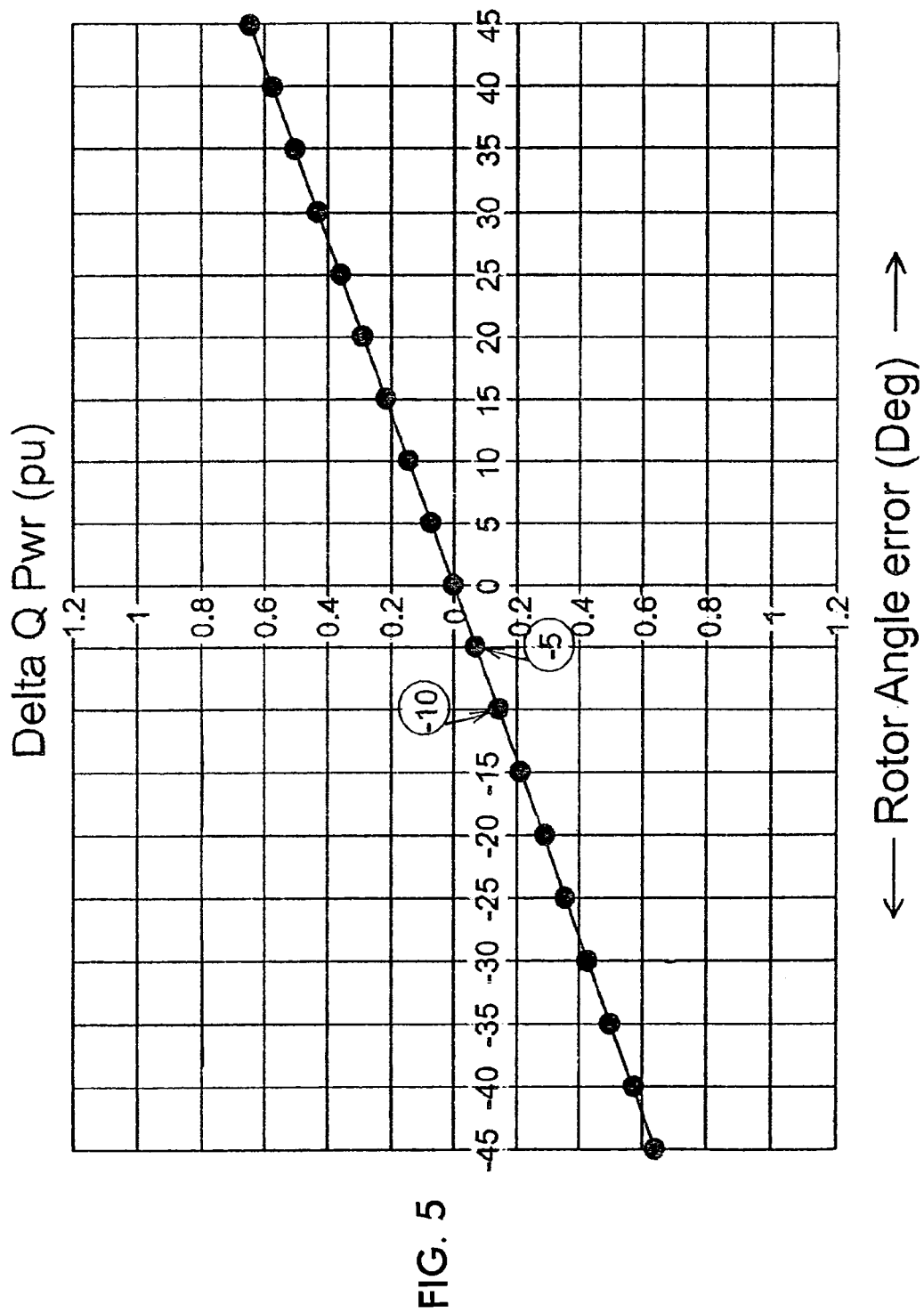
FIG. 5 is a graph showing a relationship between reactive power error vs. rotor angle error, per unitized to the motor rated power.

Thus, the reactive power error between Q and (We*C_Lq*I*I) (the vertical axis in FIG. 5) can be used to null out any rotor angle error (the horizontal axis in FIG. 5), such that the maximum torque per ampere can be maintained, even when there is an error in the resistance parameter used in the magnetic flux estimator (FIG. 3).

Figure 6:
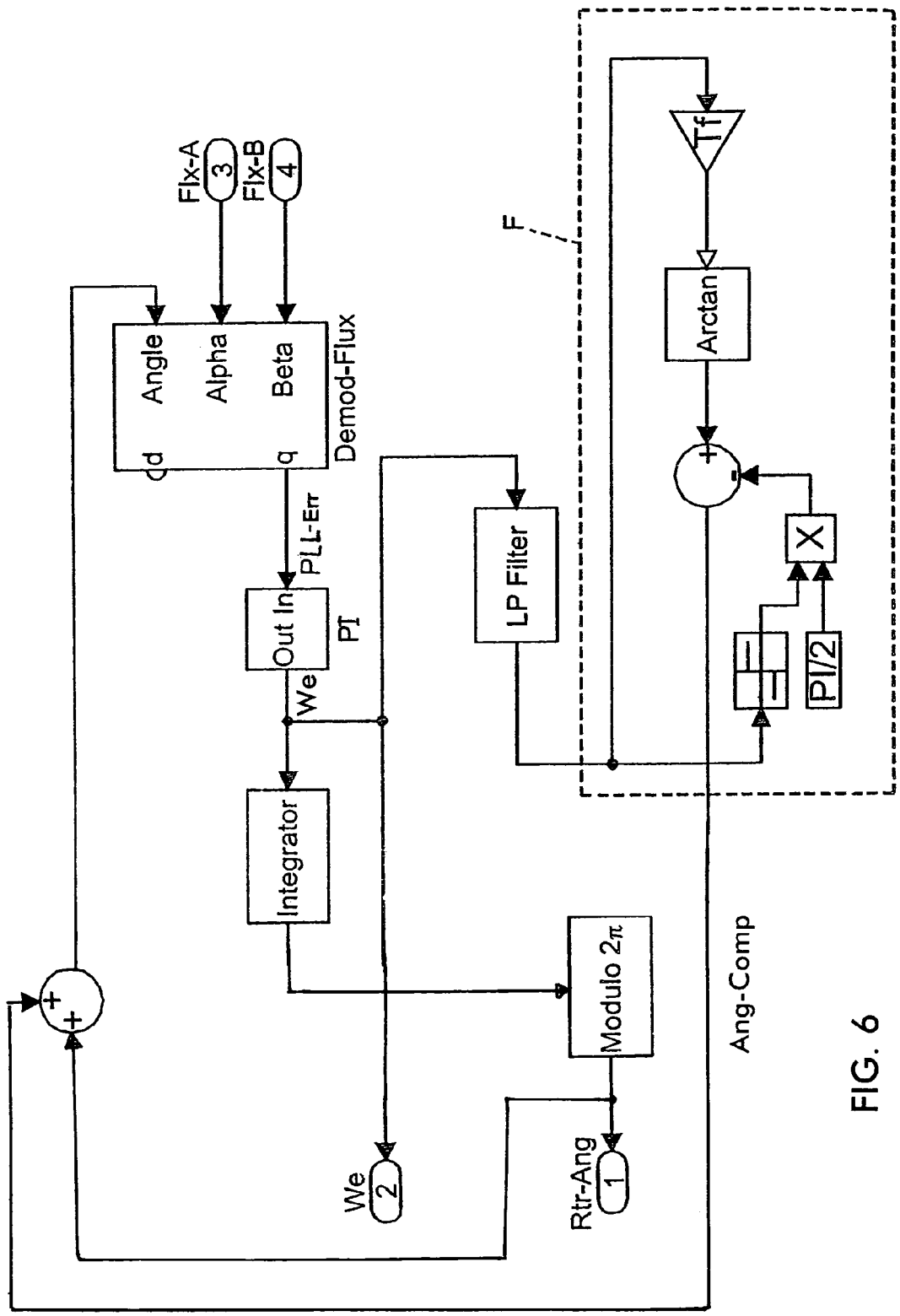
FIG. 6 is a block diagram showing a second embodiment of a rotor angle estimator.

A rotor angle estimation block according to a second embodiment of the invention is shown in FIG. 6. The system is simplified by eliminating the upper one of the Mod-2π blocks in the system of FIG. 2.

Figure 7:
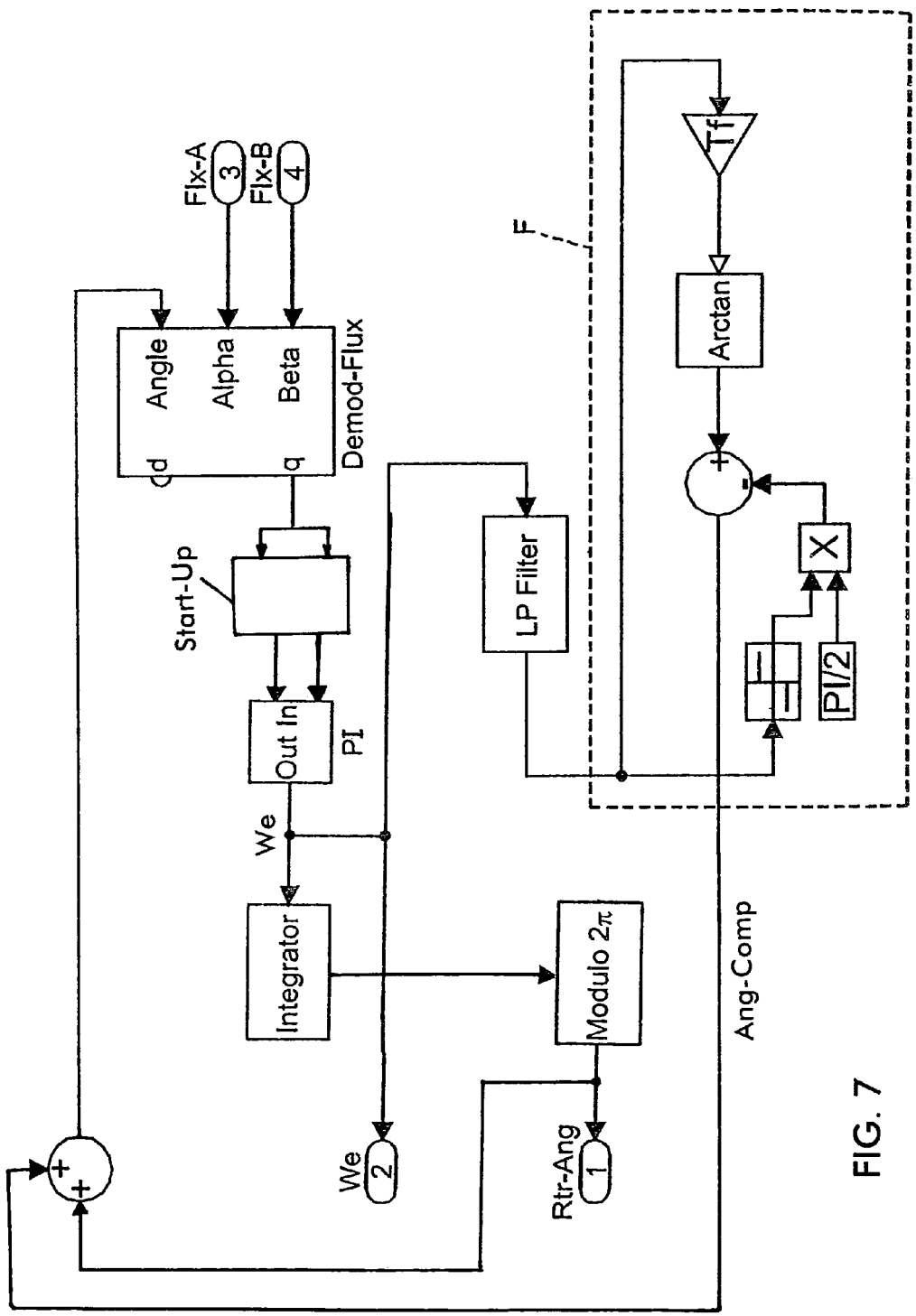
FIG. 7 is a block diagram showing a third embodiment of a rotor angle estimator.

A third embodiment is shown in FIG. 7. The system of FIG. 6 is again modified. In the first and second embodiments, the two inputs of the PI (proportional integral) regulator are tied together and both receive the Pll_Err output from Demod-Flux. In this embodiment, the two inputs of the PI regulator receive separate respective outputs of the start-up block, whose two inputs both receive Pll_Err from Demod-Flux.

Figure 8:
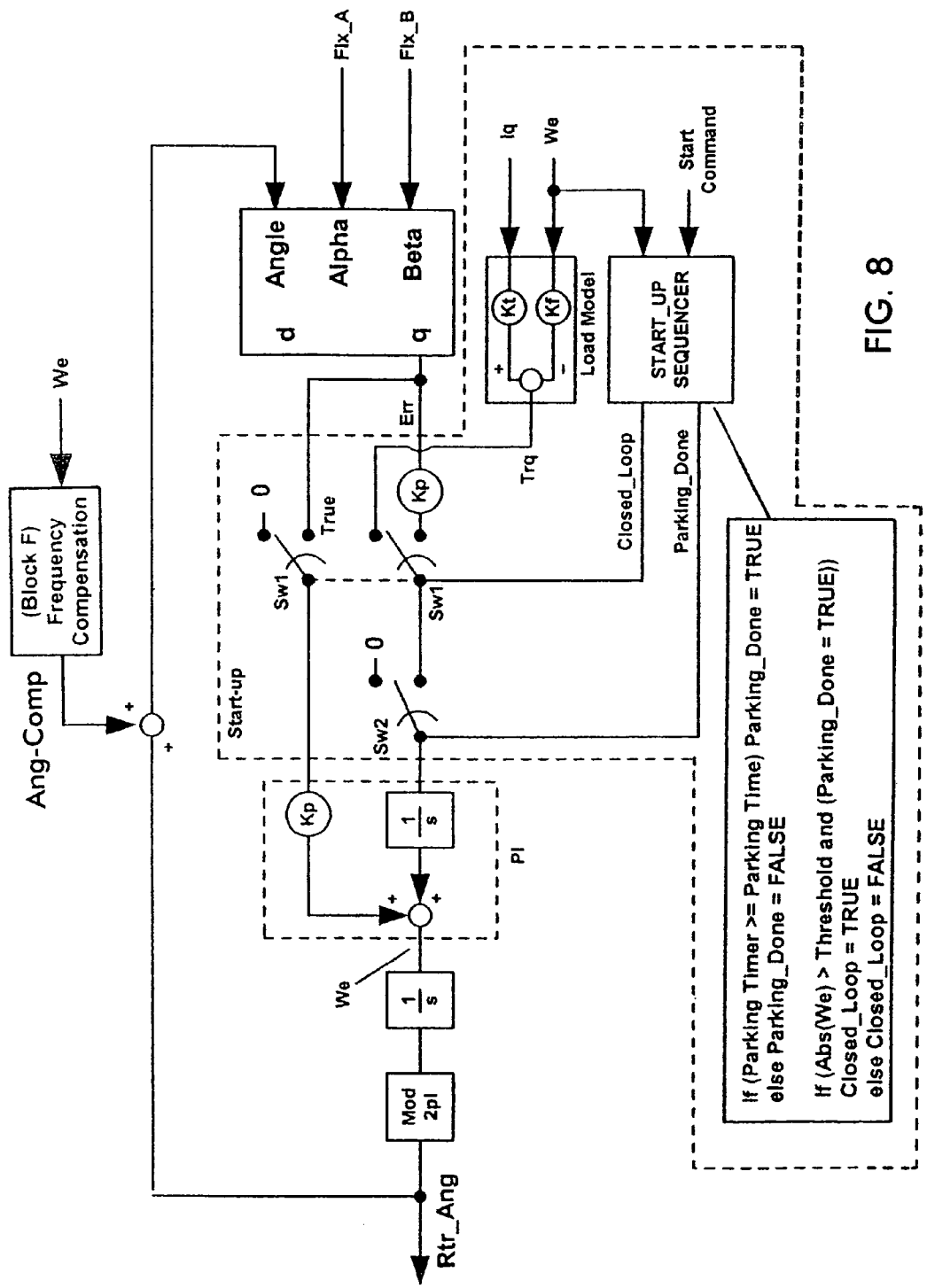
FIG. 8 shows the rotor angle estimator of FIG. 7 in more detail.

The start-up module and its interface to the PLL angle tracking module are shown in more detail in FIG. 8. In FIG. 8:

| | |
|---|---|
| Rtr_Ang | estimated rotor angle |
| Flx_A | estimated alpha flux |
| Flx_B | estimated beta flux |
| Pll_Err | PLL error signal |
| Trq | estimated motor torque |
| We | Inverter fundamental frequency. |

FIG. 6 shows the same PLL (FIG. 2) with Block F being moved to the feedback path of the PLL. This is done to provide convenience of interfacing to a start-up module. The moving of Block F will not affect the function of the PLL since the primary function of block F is phase shifting of the estimated rotor angle (Rtr_Ang). The PI block in FIG. 2 is expanded in FIG. 8 in order to show the P and I path for interfacing to a start-up module.

FIG. 8 shows the interface between the start-up module and the PLL module.

When motor BEMF is small (<10%), the fidelity of flux signals Flx_A and Flx_B (computed from estimated or measured motor voltages) deteriorates, causing an incorrect error correction signal (Pll_Err). In order to tackle this problem, Pll_Err is generated by a simple motor model (the Load Model in FIG. 8) during initial start-up. The load model is only used for a short duration of time during start-up. When motor frequency (We) reaches a certain threshold, the fidelity of Flx_A and Flx_B improves and the Pll_Err calculation is then generated from the Flx_A and Flx_B quantities.

In FIG. 8, during motor start-up, switches Sw1 and Sw2 are in their upper position. The start-up sequencer is in its parking state and the inputs to the PI regulator are zero. In the parking state, the initial motor angle is captured (by means of any common technique such as dc current injection) and initialized. After parking is done, Sw2 is closed while Sw1 is still in its upper position (open-loop mode). The integrator input of the PI regulator is fed by a simple load model which consists of two gain multipliers (Kt and Kf). The Kt path, which models the motor acceleration torque, is fed by load torque current feedback (iq). The Kf path, which models the friction torque, is fed by frequency (We).

In some cases, the acceleration torque is much larger than friction torque during motor starting, so that the use of Kf path can be eliminated in those cases.

When the motor starts accelerating, the motor frequency (We) also increases. As soon as the absolute motor frequency exceeds a certain threshold (normally 10% of the rated frequency) switch Sw1 is closed and closed-loop mode is activated.

Although the present invention has been described in relation to particular embodiments thereof, many other variations and modifications and other uses will become apparent to those skilled in the art. Therefore, the present invention is not limited by the specific disclosure herein.

What is claimed is:

1. A method of determining a rotor angle in a drive control for a motor, comprising the steps of:
   a) estimating the rotor angle on the basis of the rotor magnetic flux in the motor; and
   b) correcting the estimated rotor angle on the basis of reactive power input to the motor;
   wherein step (a) further comprises the step of (a1) estimating the rotor angle during motor start-up according to a predetermined motor load model in conjunction with a start-up sequencer.

2. The method of claim 1, wherein said load model is representative of motor acceleration torque.

3. The method of claim 2, wherein said model is responsive to load torque current feedback (iq).

4. The method of claim 2, wherein said load model is representative of friction torque.

5. The method of claim 4, wherein said model is responsive to motor frequency (We).

6. The method of claim 1, wherein said step (a1) terminates at an adjustable percentage of rated motor frequency.

7. The method of claim 6, wherein said adjustable percentage is about 10 percent.

8. The method of claim 1, wherein said step (a1) is carried out in open-loop mode and terminates at a transition from open-loop mode to closed-loop mode.

9. A method of determining a rotor angle in a drive control for a motor, comprising the steps of:

a) determining a rotor magnetic flux in the motor; and
b) estimating the rotor angle on the basis of the rotor magnetic flux in the motor, and during motor start-up according to a predetermined motor load model in conjunction with a start-up sequencer; and
c) correcting the estimated rotor angle on the basis of reactive power input to the motor;
wherein step (a) includes the step of non-ideal integration of stator voltage and current values.

10. The method of claim 9, wherein said load model is representative of motor acceleration torque.

11. The method of claim 10, wherein said model is responsive to load torque current feedback (iq).

12. The method of claim 10, wherein said load model is representative of friction torque.

13. The method of claim 12, wherein said model is responsive to motor frequency (We).

14. The method of claim 9, wherein said step (b) terminates at an adjustable percentage of rated motor frequency.

15. The method of claim 14, wherein said step (b) terminates at about 10% of rated motor frequency.

16. The method of claim 9, wherein said step (b) is carried out in open-loop mode and terminates at a transition from open-loop mode to closed-loop mode.

17. The method of claim 9, wherein step (a) further includes the step of correcting phase errors caused by said non-ideal integration via a PLL circuit with phase compensation (F).

18. A system for determining a rotor angle in a drive control for a motor, comprising:
   a first circuit for estimating a rotor angle on the basis of rotor magnetic flux in the motor; and
   a second circuit for correcting the estimated rotor angle on the basis of reactive power input to the motor;
   wherein said first circuit further estimates the rotor angle during motor start-up according to a predetermined motor load model in conjunction with a start-up sequencer.

19. The system of claim 18, wherein said load model is representative of motor acceleration torque.

20. The system of claim 19, wherein said model is responsive to load torque current feedback (iq).

21. The system of claim 19, wherein said load model is representative of friction torque.

22. The system of claim 21, wherein said model is responsive to motor frequency (We).

23. The system of claim 18, wherein said estimating step terminates at an adjustable percentage of rated motor frequency.

24. The system of claim 23, wherein said estimating step terminates at about 10% of rated motor frequency.

25. The system of claim 18, wherein said estimating step is carried out in open-loop mode and terminates at a transition from open-loop mode to closed-loop mode.

26. A system for determining a rotor angle in a drive control for a motor, comprising:
   a) a first circuit for determining a rotor magnetic flux in the motor; and
   b) a second circuit for estimating the rotor angle on the basis of the rotor magnetic flux in the motor, and during motor start-up according to a predetermined motor load model in conjunction with a start-up sequencer; and
   c) correcting the estimated rotor angle on the basis of reactive power input to the motor;
   wherein said first circuit carries out non-ideal integration of stator voltage and current values.

27. The system of claim 26, wherein said load model is representative of motor acceleration torque.

28. The system of claim 27, wherein said model is responsive to load torque current feedback (iq).

29. The system of claim 27, wherein said load model is representative of friction torque.

30. The system of claim 29, wherein said model is responsive to motor frequency (We).

31. The system of claim 26, wherein said estimating step terminates at an adjustable percentage of rated motor frequency.

32. The system of claim 31, wherein said estimating step terminates at about 10% of rated motor frequency.

33. The system of claim 26, wherein said estimating step is carried out in open-loop mode and terminates at a transition from open-loop mode to closed-loop mode.

34. The system of claim 26, wherein said second circuit corrects phase errors caused by said non-ideal integration via a PLL circuit with phase compensation (F).

35. The method of claim 1, wherein said correcting step is performed by calculating a first reactive power input value and a second reactive power input value; determining a relation between said first and second reactive power input values; and applying said relation to the rotor angle estimated in the estimating step to obtain the corrected rotor angle.

36. The method of claim 1, wherein said estimating step includes the step of non-ideal integration of stator voltage and current values, and the step of correcting phase errors caused by said non-ideal integration via a PLL circuit with phase compensation (F).

37. The method of claim 9, wherein said step of correcting the estimated rotor angle on the basis of reactive power input to the motor is carried out by calculating a first reactive power input value and a second reactive power input value; determining a relation between said first and second reactive power input values; and applying said relation to the rotor angle estimated in step (b) to obtain a corrected rotor angle.

38. The method of claim 9, wherein step (b) includes the step of correcting phase errors caused by said non-ideal integration via a PLL circuit with phase compensation (F).

39. The system of claim 18, wherein said second circuit corrects the estimated rotor angle on the basis of reactive power input to the motor, by calculating a first reactive power input value and a second reactive power input value; determining a relation between said first and second reactive power input values; and applying said relation to the rotor angle estimated in said estimating step to obtain a corrected rotor angle.

40. The system of claim 18, wherein said first circuit carries out non-ideal integration of stator voltage and current values; and wherein said second circuit corrects phase errors caused by said non-ideal integration via a PLL circuit with phase compensation (F).

41. The system of claim 26, wherein the estimated rotor angle is corrected on the basis of reactive power input to the motor, by calculating a first reactive power input value and a second reactive power input value; determining a relation between said first second reactive power input values; and applying said relation to the rotor angle estimated in step (b) to obtain a corrected rotor angle.

42. The system of claim 26, wherein said second circuit corrects phase errors caused by said non-ideal integration via a PLL circuit with phase compensation (F).

43. The method of claim 3, wherein said model applies a predetermined gain multiplier to said load torque current feedback.

44. The method of claim 5, wherein said model applies a predetermined gain multiplier to said motor frequency.

45. The system of claim 20, wherein said model applies a predetermined gain multiplier to said load torque current feedback.

46. The system of claim 22, wherein said model applies a predetermined gain multiplier to said motor frequency.

* * * * *